United States Patent

[11] 3,628,248

[72] Inventors Ernest A. Kroder
 Hellam, Pa.;
 John F. Glenn, Milford, Del.
[21] Appl. No. 843,336
[22] Filed July 22, 1969
[45] Patented Dec. 21, 1971
[73] Assignee Dentsply International Inc.
 York, Pa.

[54] PROCESS FOR FORMING ARTIFICIAL IMPLANTS
 9 Claims, 9 Drawing Figs.
[52] U.S. Cl. .................................................... 32/10 A
[51] Int. Cl. .................................................... A61c 13/00
[50] Field of Search .......................................... 32/10 A

[56] References Cited
UNITED STATES PATENTS
2,210,424 8/1940 Morrison ..................... 32/10 A Primary Examiner—Robert Peshock
Attorney—C. Hercus Just ABSTRACT: Process for forming artificial implants for replacement of vertebrate animal hard tissue elements and parts thereof and formed from synthetic resin, without preparation prior to surgery. The process includes removal of the animal tissue element or part to be replaced, investing it in quick-setting elastomeric material to form a mold cavity of the same, forming a synthetic resin reproduction of said element or part from said mold, and removing said reproduced element or part from the mold for introduction into a natural animal body, from which the original element was removed, for attachment of natural tissues thereto by natural growth.

PATENTED DEC 21 1971
3,628,248
SHEET 1 OF 2
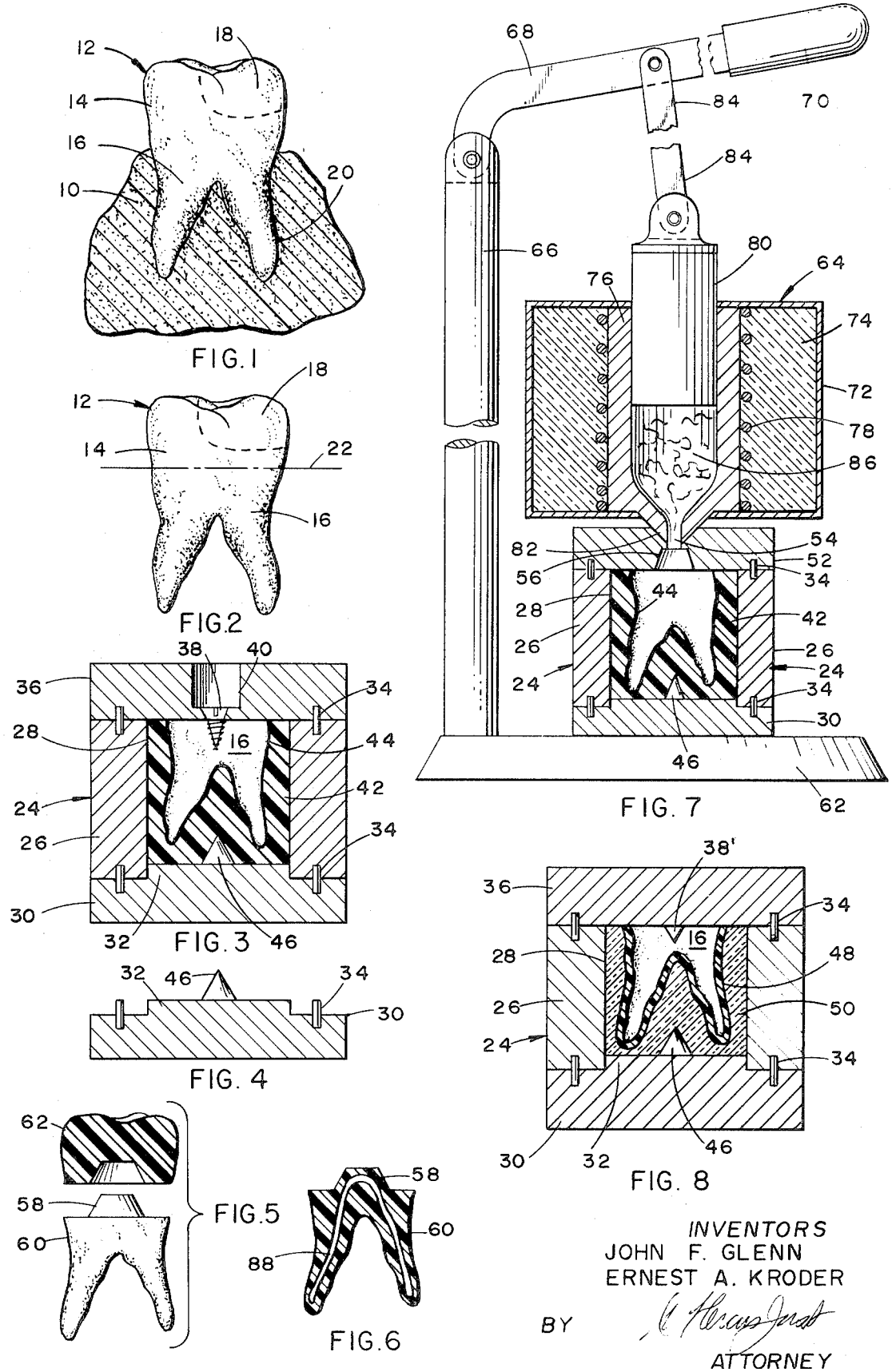
INVENTORS
JOHN F. GLENN
ERNEST A. KRODER
BY
ATTORNEY

PROCESS FOR FORMING ARTIFICIAL IMPLANTS

BACKGROUND OF THE INVENTION

For many years, the medical profession, with limited success, has endeavored to repair shattered or diseased bones or replace shattered sections of bones in the human anatomy by replacing such bones with suitable substitutes, usually of an animal nature, such as live bones obtained from sheep. Such technique obviously has great limitations because of the dissimilarity of any substantial portions of such bones in an animal to those in a human anatomy. Under some circumstances, particularly to insure affinity, and thus acceptance, of one human bone or group of bones by another, a further well-known technique has been to remove a section of a bone from one portion of a human anatomy and graft it to bones in another portion of the anatomy. Specifically, spinal vertebrae have been welded or fused in this manner by using a section of a leg bone of the same person and grafting it to selected vertebrae. This technique also has certain limitations of use for purposes of replacing or repairing certain bones in the human anatomy.

In relatively recent years, it has been found that the human anatomy will accept implants or replacement portions or sections formed from nonhuman substances, such as metals and certain ceramic items to which human tissues tend to adhere in order to restore natural muscular action as much as possible. Certain mechanical connections have been resorted to between the synthetic items and the natural bones or tissues with which they are associated. In this regard, the repair or strengthening of shattered, weakened, diseased or broken bones by the use of metal pins or plates are well known. In regard to the use of metal for such purposes, however, it also is well known that extreme caution has to be exercised to prevent the occurrence of infection as well as the prevention of corrosion of the metal by the reaction therewith of human body fluids.

The foregoing activities not only have been undertaken with respect to bones of the anatomy, but also in regard to forming artificial implants in the shape of the root or roots of teeth which are inserted in the socket from which a natural tooth has been extracted. Where suitable aseptic conditions are observed and practiced, cases are known where such procedures have been acceptable for purposes of providing either an entire artificial tooth upon which an artificial root implant is integrally formed or such artificial root-shaped implant is provided with a suitable support base for an artificial crown or the like. Examples of this latter procedure comprise the subject matter of the following U.S. Pats.:

| No. 448,745 | Wright | 1891 | Cl. 32-8 |
| No. 470,332 | Friel | 1892 | Cl. 32-8 |
| No. 943,118 | Greenfield | 1909 | Cl. 32-9 |
| No. 2,745,180 | Kiernan, Jr. | 1956 | Cl. 32-10 |
| No. 2,857,670 | Kiernan, Jr. | 1958 | Cl. 32-10 |

In all of the foregoing situations referred to above, the repair element or replacement part or section, whether used with respect to bones of the human anatomy or to replace extracted human teeth, the replacement part or implant has required preparation, or prosthesis, prior to surgery incident to installing or implanting the artificial element or section within the human anatomy. Particularly where the shape of the artificial part or section is desired to be as close as possible to that of the natural bone or tooth, for example, which it is to replace, it is obvious that considerable difficulty is experienced incident to the preparation of prosthesis of such artificial replacement part or section for immediate use during surgical operations.

In order to achieve the desired shape as closely as possible by current techniques, X-ray radiographs taken from various angles are used as a basis for determining the accurate shape and dimensions, where this technique is applicable. In regard to forming artificial root implants for substitution of the roots of natural teeth, the foregoing patents disclose the technique of forming a suitable approximate shape and relying upon the pliability of natural tissues and especially the periodontal membrane to accommodate any difference in shape of the artificial root over that of the natural root which was extracted.

Further, in view of the fact that metal and ceramic materials have been used to form the aforementioned artificial substitute members, parts or sections for replacement of the equivalent natural portions or parts of hard tissue elements of a human anatomy, it is obvious that such substitute elements cannot be formed in the very short period of time which usually is necessary to insure biological acceptance of the artificial member by the adjacent human tissues or other parts of the human anatomy. For example, it is known that if the periodontal membrane, which defines the socket from which the root of a natural tooth has just been extracted, is exposed for over 40 minutes, the probability of said membrane ultimately adhering in a natural manner to a root implant formed from nonhuman material practically is nil. It is obvious, therefore, under the circumstances, that the formation of an artificial replacement part or section of a vertebrate anatomy by the technique of directly using the natural member as a model, forming a mold therefrom, using the mold to form the artificial replacement member, such as by pouring molten metal thereinto or molding a ceramic member and then firing it, coupled with suitable finishing operations, cannot be accomplished within the relatively short period of time which nature dictates to be the acceptable period as described above.

In very recent times, experiments performed on certain animals, especially monkeys, appear to confirm the feasibility of making replacement parts and sections of bones from ceramic materials, firing the molded parts, and implanting the same within the animal tissues for the adherence of such tissues thereto in a natural manner. However, such replacement parts must be molded, fired, and otherwise completed prior to surgery in order to accomplish this. Accordingly, such artificial members must be made solely upon reliance of shapes disclosed by X-ray radiographs due to the length of time required to completely form the artificial member in finished condition.

SUMMARY OF THE INVENTION

It is the principal object of the present invention to provide a process as well as apparatus for performing the same by which substantially precisely exact copies or reproductions of natural hard tissue elements such as bone parts, members and sections may be formed from synthetic materials and particularly various suitable types of synthetic resin materials or plastics, said process requiring no preparation or prosthesis prior to surgery. X-ray radiographs may be resorted to in order to detect the location of damaged or diseased bone, teeth or the like, but such radiographs need not be employed in any manner to facilitate the formation of the artificial parts, members or sections to be implanted in the body of the vertebrate, as has been necessary heretofore.

It is another object of the invention to provide in such process the step of removing or extracting the natural hard tissue part, member or section from the vertebrate anatomy incident to surgery being performed, use said removed or extracted hard tissue element, after quickly and suitably debriding the same, to form a mold from quick-setting elastic material, using said mold to form a replacement element from suitable synthetic resin material by any one of a number of known techniques, and after quick-curing of the artificial element, the same is extracted from the mold with the result that it is a faithful reproduction of the shape of the natural element it is to replace. Thus, there is a minimum disturbance of natural tissues and material in the locality of the anatomy in which the artificial member is to be inserted and implanted, this being particularly important in the formation of tooth implants in humans for acceptance by the periodontal membrane which will adhere to the artificial element by natural growth, such growth being assured by the entire procedure consuming less time than the very restrictive period permitted by the natural processes, such as the approximately 40 minute period referred to above.

It is a further object of the invention to render the process practical and capable of being practiced readily by providing relatively simple and suitable apparatus by which the aforementioned mold may be formed, preferably from elastomeric material, as well as additional heating and injection apparatus or similar equipment which may be used to fill the mold cavity with suitable synthetic thermoplastic resin for injection into the mold cavity under pressure. Also, chemical-setting resin components, such as a combination of appropriate powder and liquid, which may be workable monomer and polymer materials and either thermosetting or thermoplastic, may be suitably introduced into the mold cavity and be permitted to self-cure, it being understood that quick-reacting ingredients are used under such circumstances.

It is still another object of the invention, particularly where the process and apparatus are to be employed for the formation of artificial tooth implants, to utilize an additional mold member capable of forming a crown preparation on one end of the root implant which otherwise is formed in accordance with the procedure and apparatus described hereinabove, thus making it possible to fulfill a longstanding desire of the dental profession to resort to the use of preformed jacket crowns which may be molded in a range of precise sizes and shapes, shades and hues, from synthetic resin or porcelain materials, any of which may be mounted upon a root insert formed in accordance with the above-described technique and by the apparatus described above, it being understood that only a very limited number of different sizes of auxiliary mold members for forming the crown preparation end of the tooth implant need be provided for use in said apparatus. Such apparatus also readily is capable of being merchandised in kit form, not only for the formation of artificial root implants, but artificial replacement for similar hard tissue items such as bone parts, members and sections.

Details of the foregoing objects, as well as details of the invention, and other objects thereof, are set forth in the following specification and illustrated in the accompanying drawing comprising a part thereof.

BRIEF DESCRIPTION OF THE DRAWINGS

FIG. 1 is a fragmentary sectional view of a portion of a human gum and an exemplary posterior tooth therein.

FIG. 2 is a side elevation of the tooth per se shown in FIG. 1 and illustrating an exemplary line of severance between the root and crown portions thereof.

FIG. 3 is a vertical section of an exemplary mold assembly for forming a negative mold of the root section of the tooth shown in FIGS. 1 and 2.

FIG. 4 is a side elevation of the bottom member of the mold assembly shown in FIG. 3.

FIG. 5 is an exploded view of a tooth root implant and an artificial crown to be cemented thereto in accordance with the principles of the invention.

FIG. 6 is a vertical section of the root implant shown in FIG. 5 and illustrating an exemplary reinforcement which may be included therein.

FIG. 7 is a side elevation of an injection-type press in which the mold assembly of FIG. 3 is included and illustrating one method of forming the tooth root implant illustrated in FIGS. 5 and 6, part of the apparatus being shown in vertical section to disclose details thereof.

FIG. 8 is a view similar to FIG. 3 but illustrating another embodiment thereof.

DESCRIPTION OF THE PREFERRED EMBODIMENTS

Figure 9:
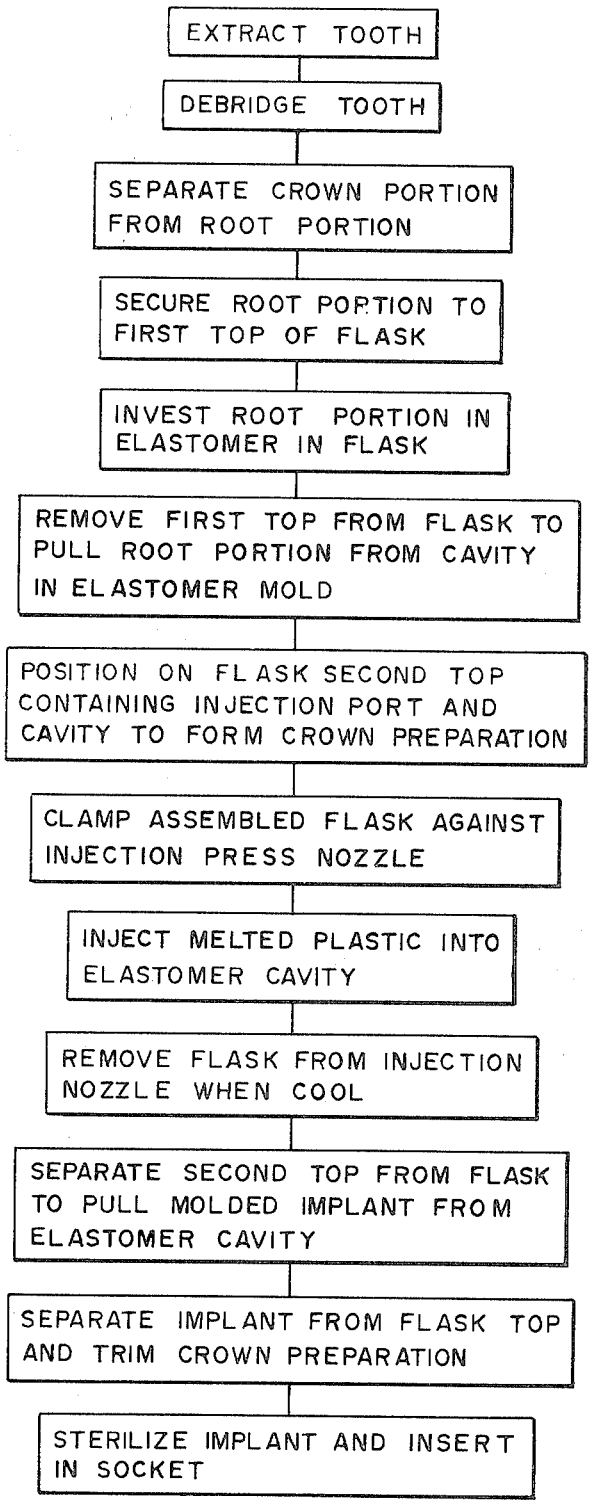
FIG. 9 is an exemplary flow sheet of the preferred process for forming tooth root implants in accordance with the present invention and an exemplary installation thereof within a natural tooth socket.

The process and apparatus comprising the present invention are capable of being used to form artificial replacement parts, members and sections of natural hard tissue of vertebrate animals such as human bone structure and teeth. Such process and apparatus are adapted especially for the formation of tooth implants to which commercially prepared jacket crowns of so-called standard sizes may be attached by cementation or otherwise. Therefore, to simplify the illustration and description of the basic principles of the invention, a tooth implant made from suitable synthetic resin by a process comprising part of the present invention has been selected to illustrate the basic principles of both the product as well as the process of forming the same. Such description and illustration is not to be regarded as restrictive, however, but merely illustrative inasmuch as the same principles can be used to form numerous other types, shapes and kinds of artificial inserts to be implanted within a living animal vertebrate body, including human bodies.

The illustration of a tooth implant and process for forming the same serves to illustrate an additional important facet of the present invention in that attempts have previously been made to manufacture, on a commercial basis, a range of different shapes and sizes, as well as shades or hues of artificial jacket crowns which, of necessity, have attachment cavities or recesses, somewhat resembling diatoric recesses in posterior teeth, for purposes of receiving the crown preparation of a natural tooth, for example. It is obvious, however, that the utilization of such a line of commercial-type jacket crowns necessitates the very precise formation of the crown preparation on the root portion of a natural tooth, for example, for attachment of a jacket crown thereto after the crown portion of the natural tooth has been removed in accordance with customary dental techniques.

The normal clearance between such a crown preparation and the recess within the jacket crown to receive the same is minimal and such that, under normal conditions, a relatively tight fit is provided and any actual space existing between the coengaging surfaces accommodates suitable cement. Therefore, forming a crown preparation on a natural tooth so as to be so precisely complementary to a recess in a commercially prepared jacket crown virtually is impossible. However, by utilizing a custom-made artificial tooth implant, particularly the root portion thereof, upon which a precisely shaped and molded crown preparation is formed further in accordance with the principles of the present invention, it now is possible to manufacture and offer to the dental profession a line of commercial-type jacket crowns having certain limited ranges of size, shades or hues, and occlusal or incisal surfaces or portions, details of which are set forth hereinafter.

Referring to the drawings, FIG. 1 illustrates an exemplary vertical sectional view through a human gum to show an exemplary multiroot tooth 12 therein comprising a crown portion 14 and a root portion 16. The tooth 12 can be either in vital or nonvital condition but because of a fracture, or natural causes such as an extensively decayed portion 18 existing, good dental practice dictates that a jacket crown should be installed. It is known, of course, that jacket crowns have been made and installed upon vital teeth for many years in which the nerve is in healthy condition. However, for purposes of demonstrating the practicality of the present invention, assume that the particular condition of the exemplary tooth 12 is such that a root implant is desired.

Without prior preparation of any kind, that is, without requiring prosthesis of any type before surgery, the process comprising the present invention is undertaken, as follows. As illustrated in the flow sheet shown in FIG. 9, the first step of the process is to extract the tooth 12 to expose the socket 20 which is substantially completely lined with a periodontal membrane to which the roots 16 of the natural tooth have been attached in a natural manner. The essence of the present invention is to provide an artificial implant and place the same within the socket 20, in association with the natural periodontal membrane lining the same, within the maximum possible period of between approximately 40 and 45 minutes within which the tissues remaining after extraction of tooth 12 are receptive to adherence to an artificial tooth or root implant when inserted within the socket 20 under required conditions described hereinafter.

Following extraction of the tooth 12, the next step in the procedure is to debride the tooth, particularly the root portion 16 thereof. This step is followed immediately by separating the crown portion 14 of the tooth 12 from the root portion 16. Such separation is effected along a precise transverse plane surface 22 represented by a broken line in FIG. 2, and is accomplished by conventional sawing or grinding means. It is preferred that the selection of the plant 22 be undertaken with care, particularly under circumstances where a commercially produced jacket crown, such as described in detail hereinafter, is to be connected to and supported by the implant to be formed.

A suitable flask 24, of appropriate size, is employed in this technique. Said flask consists of a central shell 26 which, in cross section, preferably is circular and has a cylindrical bore 28 therein of uniform diameter. A complementary bottom 30 is placed upon the lower end of the central shell 26 and preferably has a short central projection 32 on the inner face thereof, the periphery of which is complementary to the bore 28 so as to snugly fit therein. Suitable positioning pins 34, and complementary holes to receive the same, may be utilized to accurately position the bottom 30 with respect to shell 26.

The flask 24 also includes a first top 36 which is complementary to the upper end of the central shell 26 and is suitably positioned thereon by additional positioning pins 38 which are received in complementary holes respectively formed in the central shell 26 and first top 36, as illustrated in FIG. 3. The central portion of the inner surface of first top 36 receives the smoothly surfaced end of the root portion 16 of natural tooth 12. Such smoothly surfaced end of root portion 16 is appropriately firmly connected to such inner surface portion of first top 36 by any of several means.

One such connecting means is illustrated in detail in FIG. 3 in the form of a screw 38, the head of which is disposed in a counterbore 40 extending in from the upper surface of first top 36. Another appropriate connecting means is illustrated in FIG. 9 and comprises suitably cementing of the root portion 16 to the inner surface of first top 36. To facilitate such cementing, it also is preferred under the circumstances to provide a short, sharp pin 38' which projects downwardly from the inner surface of first top 36, preferably centrally thereof, for suitable disposition within the root portion 16. This may be achieved by drilling a suitable, complementary recess in the supported smooth surface of the root portion 16, such means serving suitably to position root portion 16 centrally with respect to the cylindrical bore 28.

The next step in the preferred procedure is to form within bore 28 a mold 42 which has a cavity 44 that is precisely and faithfully complementary to the root portion 14 of the natural tooth 10. Mold 42, or at least the portion thereof which surrounds the surfaces of root portion 16, should be yieldable in order to permit stripping the mold 42, when formed, from the root portion 16 as described hereinafter. Accordingly, suitable elastomeric material is utilized to form the mold 42. Specific examples of appropriate material are mercaptan rubber and silicone rubber impression materials of the type commonly employed in dental procedures and techniques for forming impressions of teeth and gums as when forming complete or partial dentures or other dental restorative devices. One attribute thereof is that it sets rapidly to form an elastic mold. Many such commercial elastomeric impression materials are available.

In forming the mold 42, an exemplary illustration of which is shown in FIG. 3, the bottom 30 of the mold is removed to expose the root portion 16 within the bore 28. Then, for example, first top 36 to which the root portion 16 is connected is used to support the root portion while dipping it in a prepared quantity of the impression material to insure coverage of all surfaces of said portion. The first top 36 then is operatively positioned against the shell 26 and an additional quantity of the impression material is spatulated into the open end of bore 28 until the interior thereof is nearly filled. Following this, the bottom 30 is operatively positioned against the shell 26 and the projection 32 thereon functions as a ram to compress the impression material within the bore 28 to form the mold 42. Preferably, the quantity of the impression material inserted within the bore 28 is slightly more than enough to fill the bore after placement of the cap 30 on shell 26. Such excess will be extruded between the bottom 30 and adjacent edge of the shell 26, thereby insuring the complete filling of the cavity defined by bore 28.

An additional technique to form the mold 42 is to spatulate a limited quantity of prepared impression material onto the surfaces of root portion 16 while the first top 36 is operatively positioned on the shell 26 and the bottom 30 is removed. After being certain that all surfaces of the root portion 16 have been coated with the impression material, additional quantities thereof are spatulated into the cavity 28 so as, preferably, to slightly more than fill the cavity after replacement of the bottom 30 and thus insure a relatively dense mold 42, free from voids, in the manner described immediately above.

In both of the procedures described above, it is preferred, particularly in the formation of a mold for making a multiroot implant, that the inner end of projection 32 of bottom 30 be provided with a conical projection 46 which is positioned so as to extend into the space between the plurality of exemplary roots illustrated in FIG. 3, for example, and thus serve to stabilize the mold 42 within the bore 28 as well as assist in distributing the elastic mold material equally with respect to the individual roots of the root portion 16.

To provide a mold which is more rigid than that resulting from the several procedures described above with respect to mold 42, attention is directed to the exemplary vertical sectional illustration shown in FIG. 8 in which the first top 36 is provided with a centering point 38' of the type briefly described hereinabove for purposes of centering the root portion 16 relative to said first top 36. Also, the root portion 16 under such circumstances is firmly cemented to the inner surface of first top 36. Said additional technique comprises, for example, dipping the root portion 16 within a prepared mixture of elastomeric impression material of the type described in detail above while the root portion 16 is freely exposed on the first top 36. If desired, a plurality of dippings may be made, if necessary, until a coating 48 of such elastic material is formed thereon which has a suitable thickness for the following purposes.

With the bottom 30 removed from the shell 26, and the first top 36 and attached root portion 16 with coating 48 thereon operatively positioned upon the shell 26, the bore 28 then is packed with a soft mixture of a suitable gypsum product similar in consistency to plaster of paris. In the dental profession, material of this type is referred to as a dental "stone." Such material is capable of setting very rapidly. A quantity of such gypsum material slightly in excess of the volume remaining within the bore 28 is introduced thereinto so as to insure that when the bottom 30 is placed in operative position with respect to shell 36, a slight amount of such gypsum material will be extruded between said bottom and shell as described above in regard to the several embodiments illustrated in FIG. 3. This operation forms a rigid mold 50 which will be lined with the yieldable inner coating 48 which actually defines the mold cavity. Such coating and mold are suitably bonded to each other so as to be capable of resisting ready separation.

The next step in the preferred process, regardless of which of the mold-forming procedures is used as described above with respect to FIGS. 3 and 9, is to remove the first top 36 from the flask by separating it from shell 26 to withdraw the root portion 16 of the natural tooth 10 from the mold cavity within elastic lining 48. Such cavity will be a precisely accurate and faithful complement of the outer surfaces of the tooth portion 16. Further in regard to the embodiment shown in FIG. 8, the coating 48 is sufficiently thick that it will permit adequate yieldability to permit withdrawing the irregularly shaped roots on the root portion 16 from the mold without injuring the rigid portions of mold 50 in any way. Also, the formation of the rigid mold 50 from hardenable gypsum material will permit the mold to withstand greater pressures for additional steps in the process described hereinafter than under conditions where the mold 42, for example, in FIG. 3, is formed entirely from yieldable elastomeric impression material.

The foregoing procedures are followed by the step of installing second top 52 upon the upper end of shell 26 while the same contains either the mold 42 shown in FIG. 3 or the mold 50, shown in FIG. 9, while the bottom 30 remains in operative position with respect to shell 26. The second top 52 is provided with an injection port 54 which preferably is central of the top and also is in direct communication with the upper end of a small mold cavity 56 which, as shown in FIG. 7, preferably is frustoconical in shape. The larger end thereof is disposed nearest the cavity 44 within mold 42. The second top 52 is maintained in operative position with respect to shell 26 by positioning pins 38, or the like.

The next step is to form an artificial tooth implant, which is a precisely accurate and faithful reproduction of the root portion 16 of the natural tooth 10, and is to be implanted within the periodontal membrane of the vital socket 20 in the gum 10 from which the natural tooth 12 has been extracted. The mold cavity 44 is utilized for this purpose. The artificial implant preferably is formed from suitable synthetic resin material, referred to commonly hereinafter as plastic material. A plastic is selected which preferably is of a quick-setting nature and three principal types are suitable for use in accordance with the principles of the invention. These comprise (1) thermoplastic synthetic resin compositions which may be melted and injected into the mold cavity 44 under pressure, (2) self-curing thermoplastic resins formed by mixing suitable powdered polymers and liquid monomers which are packed into the mold cavity successively in small quantities of each until the cavity is filled, and (3) self-curing thermosetting resins formed by mixing suitable powdered polymers and liquid monomers and successively packing small quantities thereof into the mold cavity until it is filled. Certain of the resin mixtures may contain appropriate filler materials, accelerators, cross-linking agents, and otherwise to produce an acceptable product.

The purpose of the small cavity 56 in second top 52 is to form on the artificial implant what is technically known in the dental profession as a crown preparation 58, one example of which is illustrated in FIG. 5. It is integral with the artificial implant 60 which, in turn, is a very precise and faithful copy of the root portion 16 of the natural tooth which it is to replace within the socket 20 from which the natural tooth was extracted. The implant 60 and crown preparation 58 thereon are homogeneously molded by one of the techniques referred to hereinabove, from a suitable synthetic resin or plastic material, including fillers, which are biologically acceptable to the vital animal tissues in which the implant is to be implanted. A number of suitable examples are set forth hereinafter.

By forming the crown preparation 58 through the use of the precisely shaped and dimensioned mold cavity 56, it readily can be appreciated that either by using the second top 52 with such predetermined size and shape of mold cavity 56 therein, or another similar second top selected from a limited number of second tops respectively having different sizes of mold cavities 56 therein, it is possible to provide on a desired implant 60 a crown preparation 58 upon which can be mounted a preformed crown 62 of designated size, type and hue which may be selected from stock crowns manufactured by a tooth manufacturer, for example, in accordance with conventional procedures now used to manufacture artificial teeth, whether from synthetic resin or ceramic material. All of such crowns will have a cavity of precise shape and size complementary to a selected crown preparation 58.

Under conditions where either the mold cavity 44 within mold 42 shown in FIG. 3, or the mold cavity within the elastic liner 48 of rigid mold 50 are to be packed with components of a self-curing resin or plastic material, such as by repeatedly introducing small amounts of powdered polymer and catalyst, followed by additions of appropriate amounts of liquid monomer until the cavity is filled; sufficient material also is included to fill the mold cavity 56 of second top 52 when placed upon the flask assembly 24, such as shown in exemplary manner in FIG. 7.

The following exemplary compositions of well-known synthetic resin materials may be used to form such artificial implants, in which all percentages included are by weight, and certain of which are thermoplastic while others are thermosetting. Also, limited variations in the stated percentages are possible, said stated percentages being preferred optimums.

EXAMPLES OF SELF-CURING RESIN COMPOSITIONS

1. Powder
Granular polymethyl methacrylate
(beads—150 mesh—99.5 percent
Benzoyl Peroxide—0.5 percent
 Liquid
methyl methacrylate monomer—99.5 percent
Dimethyl-p-toluidine—0.5 percent
2. Powder
Polymethyl methacrylate (beads—150 mesh)—79.0 percent
Apatite (calcium phosphate)—20 percent
Benzoyl Peroxide—1.0 percent
 Liquid
same as in composition 1
3. Powder
Polymethyl methacrylate (beads—200 mesh)—89.5 percent
Collagen powdered—10.0 percent
Benzoyl Peroxide—0.5 percent
 Liquid
same as in composition 1
4. Powder
Polymethyl methacrylate (beads—250 mesh)—50.0 percent
Aluminum Silicate Glass (—325 mesh)—49.0 percent
Benzoyl Peroxide—1.0 percent
 Liquid
methyl methacrylate monomer—79.5 percent
Ethylene dimethacrylate monomer—20 percent
Dimethyl-p-toluidine—0.5 percent
5. Powder
Methyl methacrylate polymer—39.0 percent
Glass Beads (—150 mesh)—60.0 percent
Benzoyl Peroxide—1.0 percent
 Liquid
Same as in composition 4
6. Powder
Polymethyl methacrylate (—200 mesh beads)—79 percent
Anorganic Bone (powdered—150 mesh)—20.0 percent
Benzoyl Peroxide—1.0 percent
 Liquid
same as in composition 4
7. Paste
Epoxylite CF8760—39.5 percent
Lithium Aluminum Silicate—50 percent
Methyl methacrylate monomer—10 percent
Dimethyl-p-toluidine—0.5 percent
 Catalyst liquid
Benzoyl Peroxide—1.0 percent
 Liquid
Methyl methacrylate monomer—10.0 percent
Methacrylic acid—89.0 percent 8. Powder
Polymethyl methacrylate (—150 mesh beads)—79.3 percent
Potassium chloride gran. (—150 mesh)—20.0 percent
Benzoyl Peroxide—0.7 percent
Liquid
same as in composition 4

In the powder-liquid technique, the proportions set forth above by weight normally will comprise approximately 2 parts of powder to 1 part of liquid by volume. This applies to all except example 7 in which a paste rather than a powdered material is used.

The foregoing compositions will require the following approximate intervals of time for setting:

Composition 1—6 min.    Composition 4—5 min.
Composition 2—5 min.    Compositions 5 & 6—4 min.
Composition 3—7 min.    Composition 8—5 min.

The paste-liquid combination comprising composition 7 is prepared by mixing about 1 gram of the paste with 2 drops of liquid. Setting time for this composition is approximately 3 minutes.

Composition 8 is different from the other in that it will produce a porous implant due to the fact that after the formation of the same has been completed in the mold, and upon removal from the mold, it is placed in boiling water for about 1 minute. The water extracts a portion of the potassium chloride, thereby producing porosity. Under certain conditions, it has been found that a porous surface on an artificial implant encourages membrane growth and offers somewhat of a mechanical advantage in effecting a firm union between the implant and the adjacent membrane within which it is embedded.

When the implant 60 is to be formed from thermoplastic material by injection of the same into the mold cavities illustrated, for example, in FIGS. 3, 7 and 8, suitable material, selected from a substantial number which may be used, are the following compositions.

THERMOPLASTIC RESIN MATERIALS SUITABLE FOR INJECTION MOLDING

9. Nylon 11 (PCI)—80 percent
Anorganic Bone—20 percent

Nylon 11 and the bone powder are mixed. The Nylon 11 is of suitable grain size of approximately 10 mesh for injection molding. This mixture is loaded in the cylinder of the injection press, heated to approximately 400° F. and injected into the mold.

10. Nylon 12—90 percent
Collagen Powder—10 percent

As in composition 9, the Nylon 12 is of a suitable size for injection molding and the mixtures are heated in the press to approximately 375° F. and injected into the mold.

11. Methyl Methacrylate Polymer—80 percent
Anorganic Bone—20 percent

The methyl methacrylate polymer is a product of Rohm and Haas and the mixture is moldable at approximately 325° F.

12. Acrylic MultiPolymer American Cyanamid)—80 percent
Calcium Phosphate—20 percent This mixture is heated to approximately 400° F. and injection molded into the mold.

13. Cycolac T (Marbon)—80 percent
Anorganic Bone—20 percent

This mixture is prepared and placed in the heating chamber of the injection press and injection molded at approximately 380° F.

14. Celcon M90—40(Celanese)—60 percent
1720 Glass (Corning Glass)—20 percent
Calcium Phosphate—20 percent These components are mixed and placed in the injection press, heated to 360° F. at which point they are molded by injection into the mold.

15. Cycolac JP (Marbon)—90 percent
Calcium Phosphate—10 percent

These components are mixed, heated to approximately 370° F. in the press and injection molded. Cycolac, an expandable ABS resin, produces a porous implant.

PLASTIC INJECTION MOLDING EQUIPMENT

Referring to FIG. 7, when the implant 60 is to be formed from injection molding material, the assembled flask 24, which includes the second top 52 having the mold cavity 56 therein, is placed upon the base 62 of a small, hand-type injection molding press 64. The details illustrated in FIG. 7 are intended to be exemplary rather than restrictive. The press shown therein comprises a post 66 which extends upward from base 62 and has a lever 68 pivotally connected at one end to the upper end of the post. The lever 68 preferably is of appreciable length and to accommodate the same to the drawing, the same has been foreshortened in FIG. 7. The outer end thereof has an operating handle 70 thereon.

Injection chamber 72 comprises a shell lined with insulating material 74 which surrounds a cylinder 76 around which an electric heating coil 78 is wrapped and opposite ends thereof, not shown, are connected by an appropriate conduit to an electric current outlet. The cylinder 76 has a smooth bore therein which receives a complementary ram or plunger 80 in close sliding relationship.

The lower end of the cylinder 76 has a conical discharge nozzle 82, the outer end of which is complementary to the upper end of the injection port 54 in the second top 52, as clearly shown in FIG. 7. The upper end of plunger 80 is interconnected to lever 68 by a link 84, the opposite ends of which respectively are pivotally connected to said plunger and lever, as also shown in FIG. 7.

Synthetic resin or plastic material 86 of suitable thermoplastic composition, selected, for example, from among the formulations set forth above, or otherwise, is placed in powdered form in the lower portion of cylinder 76. When melted by the heating coil 78, the plunger 80 then may be moved against the molten resin to discharge it through the nozzle 82 into the cavity within the mold 42 or 50, for example, depending upon which type of mold is being used. By applying manual force upon the handle 70, filling the mold cavity with the melted resin may readily be accomplished. Upon completion of the filling of the mold, including the mold cavity 56 within second top 52, the injection chamber 72 then is elevated to separate it from the mold and flask assembly 24.

Within the matter of a few seconds, such as described in exemplary detail above, the injected resin will have adequately set to preserve its shape incident to the molded implant 60 being withdrawn from the elastic mold 42 or the mold 50 with the elastic liner 48 without distortion of the molded configuration of the implant 60. The elastic nature of the material which defines the mold cavity permits the displacement of the mold surfaces relative to the normally irregular configurations of the artificial implant 60, whereby the shape of the latter is a precise and faithful reproduction of the shape of the root portion 16 of the natural tooth which it is to replace within the socket 20.

The injection of the implant and integral crown preparation thereon results in a sprue being connected to the crown preparation. Such sprue readily is removed quickly in accordance with normal finishing operations of injected plastic articles. After suitable sterilization of the implant, it is in condition to be inserted within the socket 20. If necessary, it may be held in operative position within the socket by appropriate conventional means such as a dental splint, for a period of time until it is determined that acceptance of the artificial implant by the periodontal membrane has been accomplished, including bonding of the membrane thereto by natural processes.

After the implant has been united sufficiently with the natural tissues as described above, a selected preformed commercial type of crown 62 may be connected to the crown preparation 58 upon the implant 60 and affixed thereto by a suitable dental cement.

Referring to FIG. 6, there is an exemplary illustration shown therein of the addition of a reinforcing member 88 which is embedded within the implant 60 incident to the same being molded within the mold cavity. The reinforcing member 88 is inserted within the mold cavity appropriately prior to the discharge of molten plastic thereinto. Under such conditions, for example, where the roots on the implant are relatively long and slender, reinforcing the same appropriately may be advisable. Under the circumstances, the reinforcing member 88 may be formed from suitable stiff wire, preformed cast metal members of stiff nature, or otherwise, both with respect to method of formation and materials employed. By the selection of a synthetic resin composition of appropriate formulation to provide adequate strength, however, the use of such reinforcing element normally should not be necessary.

From the foregoing, it will be seen that the process or technique, as well as the exemplary apparatus which has been designed for the formation of an artificial implant from synthetic resin material will result in the formation of an exact copy of the hard tissue elements which the artificial implants made in accordance with the invention are to replace within a vital vertebrate animal body. The entire procedure outlined above may be completed well within the critical time limit of between 40 and 45 minutes within which such implants must be installed within the natural cavity which is to receive them and adherence of natural tissues thereto is to be expected.

Further, especially in regard to using the principles of the invention to make artificial tooth implants, it becomes practical to manufacture commercial lines of preformed jacket crowns of precise dimensions and within appropriate size ranges, shapes and hues, for attachment to the crown preparations which are molded on the artificial implant also in accordance with the principles of the invention. As a result, the convenience and lack of trauma to the patient in providing jacket crowns by the process and apparatus of the present invention represents a vast improvement over the conventional dental practice of preparing natural teeth to receive a jacket crown, and also fabricating such jacket crown on a custom basis.

While the invention has been illustrated and described in it several preferred embodiments, it should be understood that the invention is not to be limited to the precise details herein illustrated and described since the same may be carried out in other ways falling within the scope of the invention as illustrated and described.

We claim:

1. A process for rapidly preparing an artificial implant to be substituted for a natural hard tissue element or part thereof of a vital vertebrate animal body and comprising the steps of removing a selected hard tissue element or part thereof from such animal body, investing said element or part in elastic mold material capable of setting quickly to form a negative mold thereof, withdrawing said element or part thereof from the elastic mold thus formed, injecting into said mold a synthetic resin of quick-setting characteristics which is biologically acceptable to the vital animal tissue with which it is to unite, curing said resin quickly to form an artificial positive exact reproduction of said hard tissue element or part thereof and implanting said reproduction within the space in such animal body from which the corresponding natural element or part thereof was removed within a period not appreciably in excess of 45 minutes to initiate natural growth between the periodontal membrane in said space and said implant while causing minimum disturbance to the position of said membrane within said space.

2. The process according to claim 1 in which the step of filling said mold with a synthetic resin comprises injecting said resin into said mold.

3. The process according to claim 1 in which the step of filling said mold comprises placing a mixture of liquid and powder resin components in said mold and permitting the same to self-cure.

4. The process according to claim 3 in which said resin is of a cross-linked thermosetting nature.

5. The process according to claim 1 in which said selected hard tissue element comprises a natural tooth and the removing of the same from the animal body comprises extracting said tooth, said process including the additional step of debriding said tooth prior to forming a negative mold thereof.

6. The process according to claim 5 including the further step of separating the crown portion of said extracted tooth from the root portion thereof and forming a negative mold of said root portion per se to form an artificial implant for an artificial crown.

7. The process according to claim 6 including the further step of forming a crown preparation on the end of the implant opposite the root portion thereof, such formation of the crown preparation occurring incident to molding the implant.

8. The process according to claim 6 including the further step of introducing a reinforcing member in the implant prior to the curing of the resin which forms the implant.

9. An artificial tooth implant injection molded by the method of claim 1.

* * * * *